US010862297B2

(12) United States Patent
Pilz et al.

(10) Patent No.: US 10,862,297 B2
(45) Date of Patent: Dec. 8, 2020

(54) INTRINSICALLY SAFE SENSOR FOR PROCESS AUTOMATION TECHNOLOGY

(71) Applicant: Endress+Hauser Conducta GmbH+Co. KG, Gerlingen (DE)

(72) Inventors: Stefan Pilz, Geithain (DE); Jörg Uhle, Limbach-Oberfrohna (DE); Stefan Paul, Döbeln (DE); Hendrik Zeun, Chemnitz (DE)

(73) Assignee: Endress+Hauser Conducta GmbH+Co. KG, Gerlingen (DE)

(*) Notice: Subject to any disclaimer, the term of this patent is extended or adjusted under 35 U.S.C. 154(b) by 0 days.

(21) Appl. No.: 16/362,069

(22) Filed: Mar. 22, 2019

(65) Prior Publication Data
US 2019/0296544 A1 Sep. 26, 2019

(30) Foreign Application Priority Data
Mar. 26, 2018 (DE) .................. 10 2018 107 132

(51) Int. Cl.
| H02H 9/00 | (2006.01) |
| H02J 50/10 | (2016.01) |
| G08B 21/02 | (2006.01) |
| H04Q 9/02 | (2006.01) |
| G01D 11/00 | (2006.01) |
| H02M 7/06 | (2006.01) |

(52) U.S. Cl.
CPC .............. H02H 9/008 (2013.01); G01D 11/00 (2013.01); G08B 21/02 (2013.01); H02J 50/10 (2016.02); H04Q 9/02 (2013.01); H02M 7/06 (2013.01)

(58) Field of Classification Search
CPC ........... H02H 9/008; H02H 9/00; H02J 50/10; H04Q 9/02; H04Q 9/00; H02M 7/06; G08B 21/02; G01D 11/00; G01D 21/00; G01D 3/08; G01D 11/26; G01N 27/414; G01N 27/4167; G01N 27/00
See application file for complete search history.

(56) References Cited

U.S. PATENT DOCUMENTS

| 3,509,439 A * | 4/1970 | Schicht ................. H02P 1/50 318/718 |
| 7,508,172 B1 * | 3/2009 | Nishimura .......... H02P 29/0241 290/40 A |
| 2002/0044470 A1 * | 4/2002 | Hua ................... H02M 3/33592 363/127 |

(Continued)

*Primary Examiner* — Randy W Gibson
*Assistant Examiner* — Gedeon M Kidanu
(74) *Attorney, Agent, or Firm* — Mark A. Logan; Endress+Hauser (USA) Holding Inc.

(57) ABSTRACT

The invention discloses an intrinsically safe field device for process automation technology, comprising: at least one sensor element for detecting at least one measurand; a secondary coil for transmitting and receiving data—in particular, values derived from the measurand—from a primary coil, and for receiving power from the primary coil, wherein the secondary coil comprises first and second connections; a second coupling body that is designed to be complementary to a first coupling body, wherein the second coupling body comprises the secondary coil; and a circuit assembly that is arranged downstream of the secondary coil. Within the circuit assembly, Zener diodes are connected upstream of rectifier diodes.

7 Claims, 2 Drawing Sheets

(56) References Cited

U.S. PATENT DOCUMENTS

| | | | |
|---|---|---|---|
| 2013/0175939 A1* | 7/2013 | Choudhury | H05B 41/2855 315/206 |
| 2016/0006261 A1* | 1/2016 | Pilz | H02J 5/005 307/104 |
| 2017/0017599 A1* | 1/2017 | Pilz | G06F 13/4022 |
| 2018/0003766 A1* | 1/2018 | Pilz | G01R 31/2829 |
| 2018/0034204 A1* | 2/2018 | Buschnakowski | G01N 27/36 |
| 2018/0034319 A1* | 2/2018 | Robert | H02J 50/001 |
| 2020/0081046 A1* | 3/2020 | Pechstein | H02M 1/44 |

* cited by examiner

INTRINSICALLY SAFE SENSOR FOR PROCESS AUTOMATION TECHNOLOGY

CROSS-REFERENCE TO RELATED APPLICATION

The present application is related to and claims the priority benefit of German Patent Application No. 10 2018 107 132.9, filed on Mar. 26, 2018, the entire contents of which are incorporated herein by reference.

TECHNICAL FIELD

The invention relates to an intrinsically safe sensor for process automation technology.

Intrinsically safe devices are used in environments with an explosive atmosphere.

BACKGROUND

What are known as "entity values" are specified for connecting these devices. These include voltage and current in most instances. For the user, this means that he may operate these intrinsically safe devices only with these parameters. If an intrinsically safe device has the parameters $U_i$=5.7 V and $I_i$=130 mA, for instance, care must be taken that the supplying device guarantees these values as maximum output values and ensures the input conditions of the intrinsically safe device.

Intrinsically safe devices likewise exist which have an inductive interface as a supplying interface. Located at the primary side is a connection element having a first coil, and located at the secondary side is a sensor for detecting a measurand with a second coil. The two coils form a transformer. In order to protect such an intrinsically safe device against external influences, or to keep the explosive medium away from components, such an intrinsically safe assembly is often encapsulated.

Furthermore, in addition to energy, a data transfer may also occur via such an inductive interface by means of two coils. This is realized by modulating the carrier signal, for example. The applicant sells such products under the name, "Memosens."

The definition of a maximum transmittable power represents a particular case. Theoretically, in this instance, current and voltage at the secondary side may assume arbitrary values, as long as the power output at the primary side is limited.

In order to effectively limit the voltage here as well, Zener diodes, crowbar stages, and resistors are typically used. Zener diodes are thereby preferably connected anti-serially, directly via the secondary-side coil connections of a transformer. The voltage is thus limited for the subsequent circuit.

Such a solution is not possible for an inductive interface which is to have a high efficiency. Classical Zener diodes, diode networks, and crowbar stages cannot be used, since, at >100 pF, the parasitic capacitance of the diodes is too great. The reactive currents of the interface thereby become too high, and the operating point is de-tuned. Parallel resistors are also ruled out due to degrading efficiency.

SUMMARY

The invention is based upon the aim of proposing an intrinsically safe field device having an inductive interface.

The aim is achieved via a field device comprising: at least one sensor element for detecting at least one measurand; a secondary coil for transmitting and receiving data—in particular, values derived from the measurand—from a primary coil, and for receiving power from the primary coil, wherein the secondary coil comprises first and second connections; a second coupling body that is designed to be complementary to a first coupling body, wherein the second coupling body comprises the secondary coil; and a circuit assembly that is arranged downstream of the secondary coil. The circuit assembly comprises: first, second, and third Zener diodes, wherein anodes of the first, second, and third Zener diodes are connected to the second connection of the secondary coil; first, second, and third rectifier diodes, wherein these are respectively connected anti-serially to the first, second, and third Zener diodes, rectified with one another with the cathode, wherein the anodes of the first, second, and third rectifier diodes are connected to the first connection of the secondary coil; fourth, fifth, and sixth Zener diodes, wherein the anodes of the fourth, fifth, and sixth Zener diodes are connected to the first connection of the secondary coil; and fourth, fifth, and sixth rectifier diodes, wherein these are respectively connected anti-serially to the fourth, fifth, and sixth Zener diodes, rectified with one another with the cathode, wherein the anodes of the fourth, fifth, and sixth rectifier diodes are connected to the second connection of the secondary coil.

In one embodiment, the rectifier diode has a lower depletion layer capacitance compared to the Zener diode.

In one embodiment, the rectifier diode is designed as a Schottky diode. In one embodiment, the rectifier diode is designed as SiC, GaAs, or GaN.

In order to prevent the unwanted effects of the intrinsic capacitances of the Zener diodes, a rectifier diode is thus connected upstream of each Zener diode. This rectifier diode has a low depletion layer capacitance. Schottky diodes, for instance, are suitable for this purpose. A discharge of the depletion layer capacitance is prevented via this circuit variant. The parasitic crosscurrent is thus still determined only by the comparatively lower depletion layer capacitance of the rectifier diode.

In one embodiment, a first supply voltage is tapped between the cathodes of the first Zener diode and the first rectifier diode, or the second Zener diode and the second rectifier diode, or the third Zener diode and the third rectifier diode.

In one embodiment, a second supply voltage is tapped between the cathodes of the fourth Zener diode and the fourth rectifier diode, or the fifth Zener diode and the fifth rectifier diode, or the sixth Zener diode and the sixth rectifier diode.

In one embodiment, the circuit assembly is arranged downstream of at least one additional rectifier diode.

In one embodiment, the field device comprises at least one sensor element for detecting a measurand of process automation.

The aim is further achieved via a sensor arrangement comprising a connection element and a field device as described in the preceding.

BRIEF DESCRIPTION OF THE DRAWING

This will be explained in more detail with reference to the following figures.

DETAILED DESCRIPTION

In the figures, the same features are identified with the same reference symbols.

The figures show a field device for process automation technology. The field device is designed as a sensor, which will be explained in more detail below.

Figure 1:
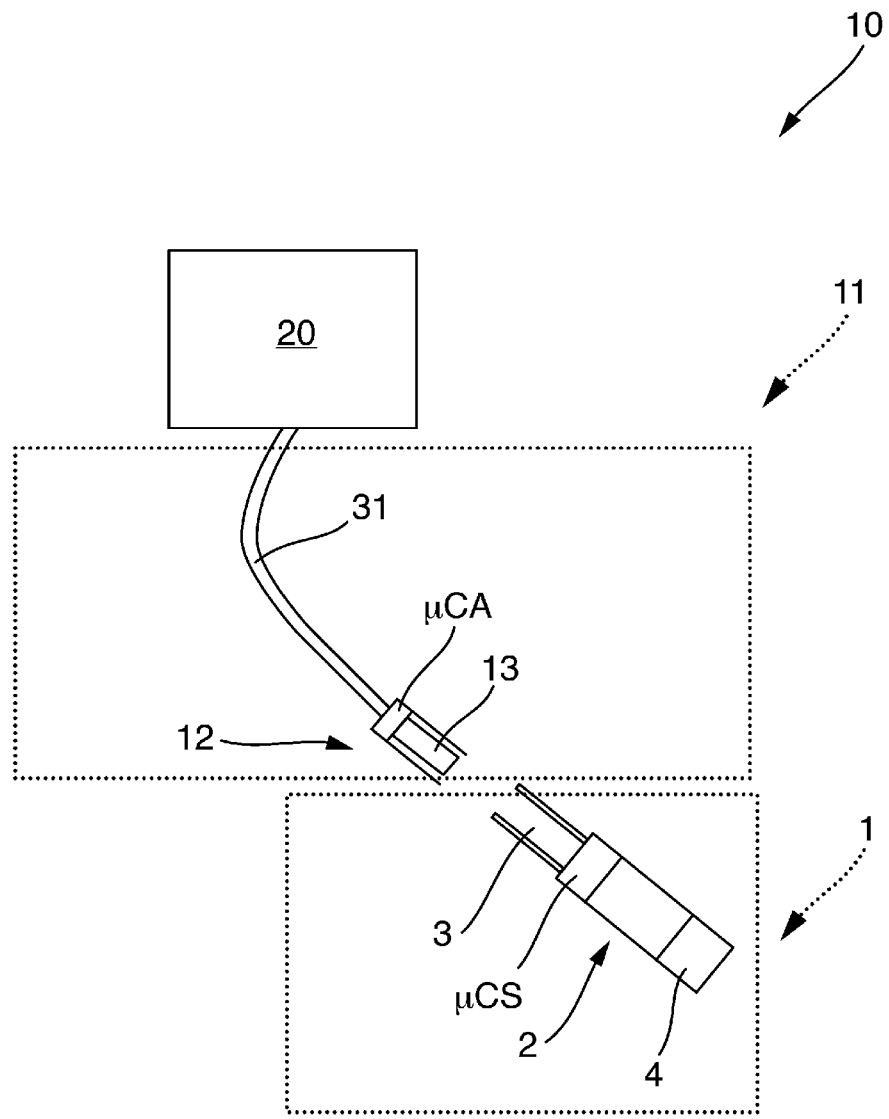
FIG. 1 shows a sensor arrangement in a symbolic overview.

A sensor arrangement 10 comprises a sensor 1 and a connection element 11, which shall be discussed first. Sensor assembly 10 is depicted in FIG. 1. A sensor 1 communicates with a higher-level unit via an interface 3. In the example, a transmitter 20 is connected. The transmitter is in turn connected to a control system (not depicted). In one embodiment, the sensor 1 communicates directly with a control system via the connection element 11. Connected at the sensor side to the transmitter 20 is a cable 31, whose other end comprises an interface 13 that is complementary to the interface 3. A connection element 11 includes cable 31, along with interface 13. The interfaces 3, 13 are designed as galvanically separated—in particular, inductive—interfaces which can be coupled to one another by means of a mechanical plug connection. The mechanical plug connection is hermetically sealed, so that no fluid, such as the medium to be measured, air, or dust, can enter from the outside.

The interfaces 3, 13 are designed as coils; within the scope of this application, these are referred to as primary coil 13 and secondary coil 3. Within the scope of this application, the terms, "inductive interface" and "coil," are used identically.

Both the sensor 1 and the connection element 11 respectively comprise at least one circuit board, on which are arranged electrical components—for instance, the data processing unit, µCS and µCA. The coils 3, 13 are, respectively, electrically and, optionally, also mechanically connected to the circuit boards.

Data (bi-directional) and power (uni-directional, i.e., from connection element 11 to sensor 1) are transmitted or transferred via the interfaces 3, 13. Sensor assembly 10 is applied predominantly in the process automation.

The sensor 1 therefore comprises at least one sensor element 4 for detecting a process automation measurand. The sensor 1 is, then, for example, a pH sensor, also an ISFET—generally, an ion-selective sensor—a sensor for measurement of the redox potential—from the absorption of electromagnetic waves in the medium, e.g., with wavelengths in the UV, IR, and/or visible range—of the oxygen, of the conductivity, of the turbidity, of the concentration of non-metallic materials, or of the temperature, along with the respectively corresponding measurand.

The sensor 1 comprises a coupling body 2 which comprises the interface 3. As previously mentioned, the interface 3 is designed for the transmission of a value, dependent upon the measurand, to the second interface 13. The sensor 1 comprises a data processing unit µCS, such as a microcontroller, which processes the values of the measurand, e.g., converts them into a different data format. In this way, an averaging, pre-processing, and digital conversion can be accomplished by the data processing unit µCS.

Sensor 1 can be connected via interfaces 3, 13 to connection element 11, and ultimately to a higher-level unit 20. As mentioned previously, higher-level unit 20 is, for example, a transmitter or a control center. The data processing unit µCS converts the value that depends upon the measurand (that is, the measured signal of sensor element 4) into a protocol that is understandable to the transmitter or the control center. Examples of this include, for example, the proprietary Memosens protocol or else HART, wirelessHART, Modbus, Profibus Fieldbus, WLAN, ZigBee, Bluetooth, or RFID. This conversion can also be carried out in a separate communications unit instead of in the data processing unit, wherein the communications unit is arranged on the side of the sensor 1 or of the connection element 11. The aforementioned protocols also include wireless protocols, so that a corresponding communications unit includes a wireless module. The coils 3, 13 are thus designed for bi-directional communication between sensor 1 and higher-level unit 20. As mentioned, in addition to communication, the coils 3, 13 also ensure the supply of power to the sensor 1.

The connection element 11 comprises a cylindrical coupling body 12 that is designed to be complementary to first coupling body 2 and that can be plugged, with a sleeve-like end section, onto the first coupling body 2, wherein the interface 13 is plugged into the interface 3. An opposite arrangement, in which the interface 13 has a sleeve-like design and the interface 3 has a plug-like design, is possible without any inventive step.

Figure 2:
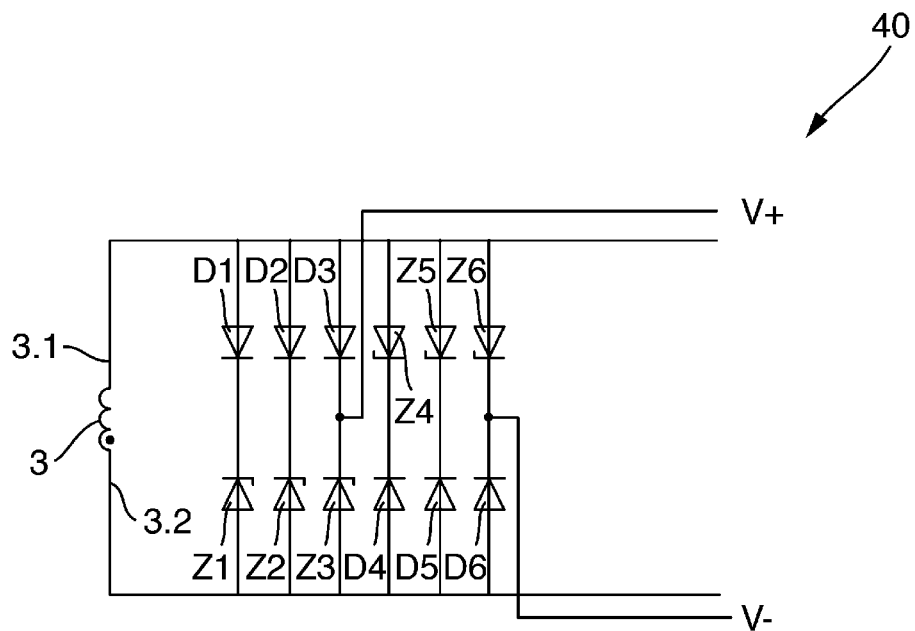
FIG. 2 shows a circuit assembly of a sensor of the sensor arrangement.

FIG. 2 shows a circuit assembly 40 that is arranged downstream of the secondary coil 3. The circuit assembly 40 comprises first, second, and third Zener diodes Z1, Z2, and Z3. The respective anodes are thereby connected to the second connection 3.2 of the secondary coil 3. The circuit assembly 40 further comprises first, second, and third rectifier diodes D1, D2, and D3, wherein these are respectively connected anti-serially to the first, second, and third Zener diodes Z1, Z2, Z3, thus respectively rectified with one another with the cathode. The anodes of the first, second, and third rectifier diodes D1, D2, and D3 are thereby connected to the first connection 3.1 of the secondary coil 3. The circuit assembly 40 further comprises fourth, fifth, and sixth Zener diodes Z4, Z5, and Z6, wherein the anodes of these are connected to the first connection 3.1 of the secondary coil 3. The circuit assembly 40 further comprises fourth, fifth, and sixth rectifier diodes D4, D5, and D6, wherein these are respectively connected anti-serially to the fourth, fifth, and sixth Zener diodes Z4, Z5, Z6, thus respectively rectified with one another with the cathode. The anodes of the fourth, fifth and sixth rectifier diodes D4, D5, and D6 are thereby connected to the second connection 3.2 of the secondary coil 3.

The diodes D1, D2, D3, D4, D5, and D6 are designed as rectifier diodes and have a low depletion layer capacitance. They are designed as Schottky diodes. A discharge of the depletion layer capacitance is thereby prevented. The parasitic crosscurrent is thus only determined by the—in comparison with the Zener diode—lower barrier layer capacitance of the rectifier diode.

In FIG. 2, a first supply voltage V+ is tapped between the diode D3 and the Zener diode Z3. Furthermore, a second supply voltage V− is tapped between the diode Z6 and the Zener diode D6. These supply voltages V+, V− serve to supply the sensor 1.

Figure 3:
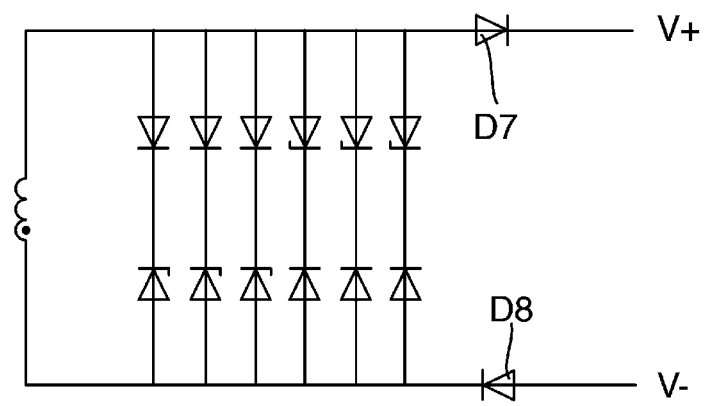
FIG. 3 shows an embodiment of the circuit assembly of a sensor of the sensor arrangement.

FIG. 3 shows basically the same design as FIG. 2. Deviating from this, in FIG. 3, the supply voltage V+ or V− is tapped after a diode D7 or D8. The diodes D7 and D8 act as rectifier diodes, so that, respectively, only either a positive half-wave or negative half-wave serves for supply.

The invention claimed is:

1. An intrinsically safe field device for process automation technology, comprising:

a sensor element for the detection of a measurand;

a secondary coil configured to transmit and receive data from a primary coil and further configured to receive power from the primary coil, wherein the secondary coil includes a first connection and a second connection;

a second coupling body that is designed to be complementary to a first coupling body, wherein the second coupling body includes the secondary coil; and a circuit assembly that is arranged downstream of the secondary coil, wherein the circuit assembly includes:

a first Zener diode, a second Zener diode, and a third Zener diode, wherein an anode of the first Zener diode, an anode of the second Zener diode, and an anode of the third Zener diode are connected to the second connection of the secondary coil;

a first rectifier diode, a second rectifier diode, and a third rectifier diode, wherein a cathode of the first rectifier diode is connected to a cathode of the first Zener diode, a cathode of the second rectifier diode is connected with a cathode of the second Zener diode, and a cathode of the third rectifier diode is connected with a cathode of the third Zener diode, and wherein the anode of the first rectifier diode, the anode of the second rectifier diode, and anode of the third rectifier diode are connected to the first connection of the secondary coil;

a fourth Zener diode, a fifth Zener diode, and a sixth Zener diode, wherein an anode of the fourth Zener diode, an anode of the fifth Zener diode, and an anode of the sixth Zener diode are connected to the first connection of the secondary coil; and a fourth rectifier diode, a fifth rectifier diode, and a sixth rectifier diode, wherein a cathode of the fourth rectifier diode is connected to a cathode of the fourth Zener diode, a cathode of the fifth rectifier diode is connected with a cathode of the fifth Zener diode, and a cathode of the sixth rectifier diode is connected with a cathode of the sixth Zener diode, wherein an anode of the fourth rectifier diode, an anode of the fifth rectifier diode, and an anode of the sixth rectifier diode are connected to the second connection of the secondary coil.

2. The intrinsically safe field device according to claim 1, further comprising:
an additional rectifier diode arranged downstream of the circuit assembly.

3. The intrinsically safe field device according to claim 1, further comprising:
a sensor element for detecting a measurand of the process automation.

4. The intrinsically safe field device according to claim 1, wherein each rectifier diode has a lower depletion layer capacitance compared to each Zener diode.

5. The intrinsically safe field device according to claim 4, wherein each rectifier diode is designed as a Schottky diode.

6. The intrinsically safe field device according to claim 1, wherein a first supply voltage is tapped between the cathode of the first Zener diode and the cathode of the first rectifier diode, or between the cathode of the second Zener diode and the cathode of the second rectifier diode, or between the cathode of the third Zener diode and the cathode of the third rectifier diode.

7. The intrinsically safe field device according to claim 6, wherein a second supply voltage is tapped between the cathode of the fourth Zener diode and the cathode of the fourth rectifier diode, or between the cathode of the fifth Zener diode and the cathode of the fifth rectifier diode, or between the cathode of the sixth Zener diode and the cathode of the sixth rectifier diode.

* * * * *